(12) United States Patent
Ponticelli

(10) Patent No.: US 9,517,785 B2
(45) Date of Patent: Dec. 13, 2016

(54) APPARATUS FOR CONVEYING GOODS AND/OR A PERSON

(71) Applicant: Pius Ponticelli, Kappel (CH)

(72) Inventor: Pius Ponticelli, Kappel (CH)

( * ) Notice: Subject to any disclaimer, the term of this patent is extended or adjusted under 35 U.S.C. 154(b) by 0 days.

(21) Appl. No.: 14/948,930

(22) Filed: Nov. 23, 2015

(65) Prior Publication Data

US 2016/0075360 A1  Mar. 17, 2016

Related U.S. Application Data

(62) Division of application No. 14/058,835, filed on Oct. 21, 2013, now abandoned.

(30) Foreign Application Priority Data

Oct. 24, 2012 (DE) .................... 20 2012 104 097 U

(51) Int. Cl.
*B62B 3/02* (2006.01)
*B62B 5/08* (2006.01)
*B62B 7/12* (2006.01)
*B62B 5/00* (2006.01)
*B62B 9/10* (2006.01)

(52) U.S. Cl.
CPC ................ *B62B 3/02* (2013.01); *B62B 3/027* (2013.01); *B62B 5/00* (2013.01); *B62B 5/087* (2013.01); *B62B 7/12* (2013.01); *B62B 9/102* (2013.01)

(58) Field of Classification Search
CPC ........... B62B 3/025; B62B 3/027; B62B 5/087
See application file for complete search history.

(56) References Cited

U.S. PATENT DOCUMENTS

| | | | |
|---|---|---|---|
| 2,382,989 | A | 8/1945 | Gilbert |
| 3,000,645 | A | 9/1961 | Schmidt |
| 4,741,551 | A | 5/1988 | Perego |
| 4,824,167 | A | 4/1989 | King |
| 5,544,904 | A | 8/1996 | Maher |
| 5,622,375 | A | 4/1997 | Fairclough |
| 5,882,022 | A | 3/1999 | Convertini et al. |
| 6,098,492 | A | 8/2000 | Juchniewicz et al. |
| 6,378,891 | B1 | 4/2002 | Maher et al. |
| 6,422,634 | B2 | 7/2002 | Lundh |
| 6,523,840 | B1 | 2/2003 | Koppes et al. |
| 6,530,591 | B2 | 3/2003 | Huang |
| 7,226,059 | B1 | 6/2007 | Samuels |

(Continued)

FOREIGN PATENT DOCUMENTS

| | | | | |
|---|---|---|---|---|
| DE | 19856875 A1 | 7/1999 | | |
| DE | 10204478 A1 | * | 8/2003 | ................ B62J 7/06 |

(Continued)

*Primary Examiner* — Hau Phan
*Assistant Examiner* — Jacob Meyer
(74) *Attorney, Agent, or Firm* — Bachman & LaPointe, PC

(57) ABSTRACT

A conveying apparatus comprising a first frame part and a second frame part, each frame part has roller elements on one end and the frame parts movable relative to one another, a guide handle provided on a first end of the first frame part, a footboard provided on the second end of the first frame part, a handhold provided on the first frame part between the guide handle and the footboard, and a transport container suitable for transporting wares fastened to both the first frame part and the second frame part.

1 Claim, 1 Drawing Sheet

(56) References Cited

U.S. PATENT DOCUMENTS

| | | | |
|---|---|---|---|
| 7,566,069 B1 | 7/2009 | Ortega et al. | |
| 7,581,737 B2 | 9/2009 | Cousin | |
| 7,694,980 B2 * | 4/2010 | Dotsey | B60B 33/0002 280/47.36 |
| 8,029,007 B2 | 10/2011 | Jones et al. | |
| 8,070,179 B2 * | 12/2011 | Pike | B62B 7/10 280/642 |
| 8,070,180 B2 | 12/2011 | Stiba | |
| 8,220,823 B2 | 7/2012 | Queen | |
| 8,282,109 B1 | 10/2012 | Arjomand et al. | |
| 8,366,141 B2 | 2/2013 | Crisp | |
| 8,544,857 B2 | 10/2013 | Schnarr et al. | |
| 8,631,892 B2 | 1/2014 | Constin | |
| 8,714,582 B2 | 5/2014 | Hei et al. | |
| 2002/0149163 A1 | 10/2002 | Lee, Jr. | |
| 2003/0030252 A1 | 2/2003 | Huang | |
| 2005/0098982 A1 * | 5/2005 | Huang | B62B 7/08 280/642 |
| 2006/0001226 A1 | 1/2006 | Refsum | |
| 2006/0226635 A1 | 10/2006 | Huang | |
| 2007/0114738 A1 | 5/2007 | Jones et al. | |
| 2007/0126207 A1 | 6/2007 | Rojas et al. | |
| 2008/0001370 A1 | 1/2008 | Cousin | |
| 2008/0088115 A1 | 4/2008 | Yang et al. | |
| 2008/0315563 A1 | 12/2008 | Crisp | |
| 2009/0127828 A1 | 5/2009 | Longenecker et al. | |
| 2009/0236826 A1 | 9/2009 | Queen | |
| 2009/0315300 A1 | 12/2009 | Stiba | |
| 2010/0109270 A1 | 5/2010 | Hei et al. | |
| 2010/0176574 A1 | 7/2010 | Pollice | |
| 2012/0013089 A1 | 1/2012 | Reeves | |
| 2012/0223496 A1 | 9/2012 | Ohnishi | |
| 2013/0153322 A1 | 6/2013 | Constin | |
| 2014/0008881 A1 | 1/2014 | Ponticelli | |
| 2014/0159346 A1 | 6/2014 | Laffan et al. | |
| 2014/0183844 A1 | 7/2014 | Iryami | |
| 2014/0232088 A1 * | 8/2014 | Ektron | B62B 7/12 280/648 |

FOREIGN PATENT DOCUMENTS

| | | | | |
|---|---|---|---|---|
| DE | 102006049770 A1 * | 5/2008 | | A45C 5/14 |
| DE | 202010008211 U1 | 10/2010 | | |
| DE | 202011051444 U1 | 11/2011 | | |
| DE | 202011051437 U1 | 1/2012 | | |
| DE | 202011106382 U1 * | 1/2012 | | B62B 1/12 |
| GB | 2505880 A | 3/2014 | | |

* cited by examiner

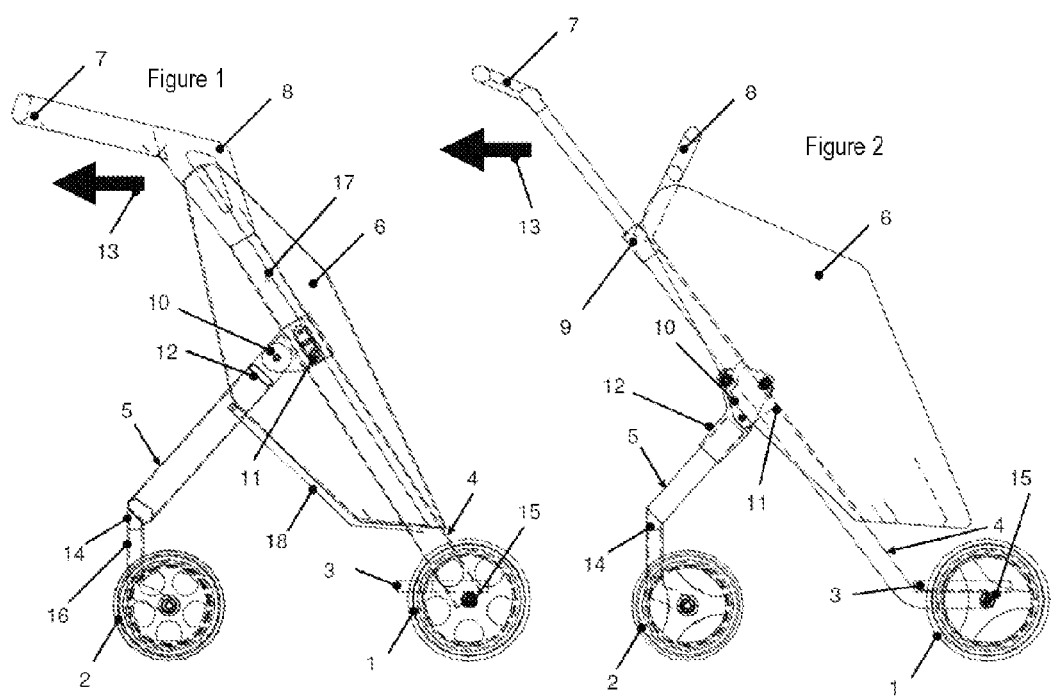

APPARATUS FOR CONVEYING GOODS AND/OR A PERSON

CROSS-REFERENCE TO RELATED APPLICATIONS

This instant application is a voluntary divisional application of U.S. patent application Ser. No. 14/058,835, filed Oct. 21, 2013, claiming priority of DE Application No. 20 2012 104 097.2, filed Oct. 24, 2012.

BACKGROUND OF THE INVENTION

The present invention relates to a conveying apparatus.

Various types of apparatus for conveying goods are known and customary from the prior art. For example, DE 20 2011 051 444 shows an apparatus for conveying goods. If required, provision is made to fit a rolling footboard on this apparatus. Thus, the apparatus is suitable for transporting not only goods but also a person, in particular a child.

In this connection, reference is made to DE 198 56 875 A1. Said document describes a handcart consisting of a rod system, two wheels or rollers and a textile volume which is guided either in front of or behind the user. What is special about this is that the rod system consists of two substantially rectilinear elements which are connected movably together in the handle region. In the lower region—that is to say in the vicinity of the rollers—the elements are kept spaced apart by a cross member. This cross member can be removed or folded together or moved on one side along the element. Furthermore, a property having the same effect allows the elements to be collapsed. In this case, the wheels or rollers are fitted in the lower region of the elements or on the cross member and are provided with a parking or blocking apparatus. In this way, the handcart is intended to be prevented from rolling away when erected.

Furthermore, various types of apparatus for moving persons are also known from the prior art. In this connection, reference is made for example to DE 20 2010 008 211 U1. Said document describes a wheeled children's toy, in particular a two wheeler or three wheeler. It has a removable seat and is characterized in that the seat has a holding device which is designed is to fasten the seat removed from the children's toy to a tabletop. An apparatus for moving a person is shown in turn in DE 20 2011 051 437 U1, wherein the apparatus is constructed in a collapsible manner.

A disadvantage of the apparatuses corresponding to the prior art is that they are constructed in a complicated manner and are often inflexible. Furthermore it is often complicated to transport a person.

The object of the present invention invention is to provide an apparatus which can be produced cost-effectively, allows the user great flexibility and requires no measures when, in addition to the goods to be conveyed, a person is also intended to be conveyed.

SUMMARY OF THE INVENTION

The foregoing object is achieved wherein an apparatus according to the invention allows goods, in particular merchandise, to be transported. At the same time, it is suitable for transporting persons. Limits are placed here on the age and size or weight of the persons to be transported only to the extent that the structure of the apparatus has sufficient stability. It is conceivable to embody the apparatus in a more stable manner for example by using stronger materials or more stable connections between the individual parts of the apparatus, if primarily larger and/or heavier persons are intended to be conveyed. On the other hand, the apparatus according to the invention can also be designed for smaller and/or lighter persons with regard to material selection and construction. In particular, the apparatus is then intended for conveying children. In this case, it can also be constructed in a more cost-effective manner, since less strong materials and less stable connections are required, with the result that production costs can be saved.

The apparatus according to the invention has a transport container, in particular a bag, and at least two roller elements. The intention is to provide different transport containers without departing from the scope protected by the invention. Thus, a transport container or a transport device for beverage bottles or beverage crates is also conceivable.

In a preferred exemplary embodiment, the footboard is fitted between two roller elements and a third roller element serves as a guide wheel, wherein the third roller element is fastened to the other frame part.

The at least two roller elements are preferably connected together in pairs via axles. The at least two roller elements are furthermore fastened in each case in pairs to a frame part. One of the frame parts also serves in this case for fastening the bag. In a preferred embodiment, the apparatus has two frame parts that are connected together.

The apparatus has a footboard immediately above an axle by means of which the roller elements are fastened to the first frame part. A person to be conveyed can easily climb onto this footboard and hold on to separate handles, which are fastened to the first frame part, during transport. The person to be conveyed stands in this case directly above the axle, that is to say close to the ground, with the result that transport and also climbing on and off is safe.

It is also conceivable to dispense with the handles for the person to be conveyed. In this case, the person to be conveyed can hold on to one of the frame parts of the apparatus.

Furthermore, embodiments of the apparatus according to the invention are conceivable in which the footboard is fastened in each case to different points of the apparatus. Thus it is, for example, possible to fit the footboard over the axle in that a device, for example a sleeve or the like, is integrally formed on the footboard. Alternatively, the footboard may be fastened immediately above, but not to the axle, rather, for example, to the first frame part of the apparatus.

If the footboard is fastened to the axle by way of a corresponding device, for example a sleeve, it is conceivable to configure the fastening in a flexible manner. It should thus be possible, for example, to allow a movement of the footboard, in particular about the axle. This movement about the axle is preferably limited so that at the point of a rigid fastening, such a fastening is present with play.

It is conceivable for one or both frame parts or frame sections to be configured in a telescopic manner. Telescopically configured handles are also conceivable.

A rotary element assigned in each case to at least one pair of the roller elements allows a user to handle the apparatus easily, since a change in direction while traveling is enabled in a simple manner thereby.

It is furthermore conceivable to configure the frame parts of the apparatus such that the second frame part is mounted in a movable manner on the first frame part. In this case, a variety of known latching or securing devices may be integrated in order to fix the position of the frame parts relative to one another. A guide device which is operatively connected to the two frame parts is also conceivable. An operative connection comprises in this case a rotatable connection.

The flexibility of the apparatus is furthermore increased in preferred exemplary embodiments in that the frame parts are pivotable with respect to one another. Preferably, to this end, the apparatus has a joint between the two frame parts. In this way, space-saving stowage is ensured. It is conceivable here to provide one or more latching or securing devices which make it possible to fix the position, adjustable by means of the joint, of the frame parts with respect to one another.

Although this is not the primary purpose of the apparatus, it is noted here that it is possible without problems to transport only a person without goods.

It is furthermore particularly advantageous that the apparatus does not impede the user while moving, since he does not touch it with his legs or feet.

It is furthermore advantageous that children can easily climb or jump on and off while the apparatus is moving. Thus, the apparatus fulfills the function of fun and games for children.

BRIEF DESCRIPTION OF THE DRAWINGS

Further advantages, features and details of the invention can be gathered from the following description of preferred exemplary embodiments and with reference to the drawings, in which:

FIG. 1 shows a side view of a first embodiment of an apparatus according to the invention;

FIG. 2 shows a side view of a second embodiment of an apparatus according to the invention.

DETAILED DESCRIPTION

FIG. 1 illustrates an apparatus for conveying goods and optionally persons. The apparatus consists of two frame parts 4, 5 which are connected together and each carry roller elements 1, 2 at the end side. The connection between the two frame parts 4, 5 is ensured by a first connecting device 11. The connecting device 11 is assigned a latching and securing device 17. This connecting device 11 is movable on the first frame part 4. The connection to the second frame part 5 takes place via a joint 10 connected to the connecting device 11 and via a second connecting device 12. A guide device 18 is connected to both frame parts 4, 5.

A footboard 3 is integrally formed on the first frame part 4 via an axle 15 carrying the roller elements 1. At the other end, a handle 7 is integrally formed on the first frame part 4. At a distance from this first handle 7, the first frame part 4 has a second handle 8. The bag 6 is fastened to both frame parts 4, 5. The second frame part 5 is connected to a frame section 16 via a rotary joint 14, the roller element 2 being fastened at the end of said frame section 16.

FIG. 2 illustrates an embodiment of the apparatus according to the invention which is slightly modified compared with the apparatus illustrated in FIG. 1. Firstly, the second lever 8 is connected to the first frame part 4 via a sleeve 9 integrally formed on said lever 8. Secondly, the connecting device 11 is mounted in an immovable manner on the first frame part 4. Furthermore, the bag 6 is fastened only to the first frame part 4. The footboard 3 is, as shown in the embodiment illustrated in FIG. 1, fastened immediately above the axle 15. However, the footboard 3 also rests on the first frame part 4 in the exemplary embodiment illustrated in FIG. 2.

Furthermore, in FIG. 2, the handle 7 is mounted in a telescopic manner in the first frame part.

With reference to FIGS. 1-2, the mode of operation of the apparatus according to the invention is explained as follows:

A user moves or pulls the apparatus in the direction of movement 13. Expediently, he uses the handle 7 for this purpose. Goods, for example shopping, may be stowed in the bag 6. A person, preferably a child, can stand on the footboard 3 and hold on to the handle 8. In this way, goods and or persons are transported easily. Since the apparatus has 14 a rotary joint, via which the front roller element 2 in the direction of travel is fastened, the user can steer the apparatus easily.

The guide device 18 serves to guide the apparatus when the first connecting device 11 is slid on the first frame part 4. Furthermore, a latching or securing device 17 is provided which serves to lock the connecting device 11 on the first frame part 4.

The invention claimed is:

1. A conveying apparatus comprising:
a first frame part and a second frame part, wherein at least one of the first and second frame parts is telescopically extendable and the first and second frame parts are pivotable with respect to one another, each frame part has roller elements each being rotatable about a central axis on one end and the frame parts are movable relative to one another;
a guide handle is provided on a first end of the first frame part;
a footboard is provided on the second end of the first frame part;
a lever is provided on the first frame part between the guide handle and the footboard;
a transport container suitable for transporting wares;
the footboard is fixedly located between the roller elements at an end of the first frame part above the central axis of each roller element, wherein a space is formed between the container and the footboard, the footboard is fitted immediately above an axle of the first frame part, the footboard is arranged horizontally with respect to a support surface and an upper side of the footboard is positioned below and spaced from a lowermost portion of the transport container when the apparatus is in a deployed position;
the transport container is fastened only to the first frame part, the first frame part and the second frame part are linked to each other through a connecting device comprising a rotary joint, wherein the connecting device is mounted in an immovable manner on the first frame part; and
the lever is connected to the first frame part via a sleeve integrally formed on said lever.

* * * * *